No. 767,210. PATENTED AUG. 9, 1904.
R. DIETRICH.
PAPER STUFF WATER CIRCULATING APPARATUS FOR PAPER MILLS.
APPLICATION FILED APR. 1, 1903.
NO MODEL. 3 SHEETS—SHEET 3.
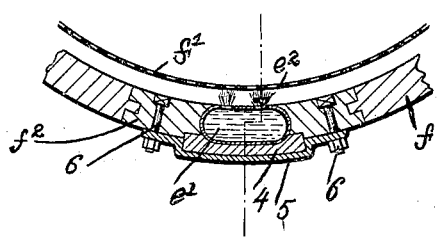
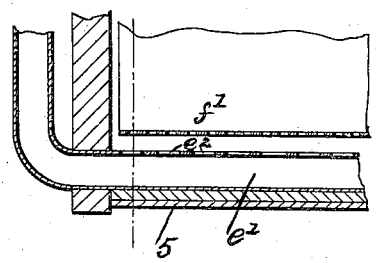
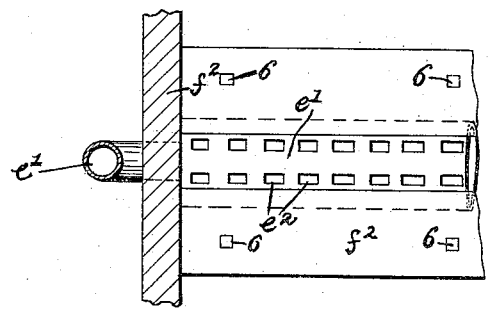

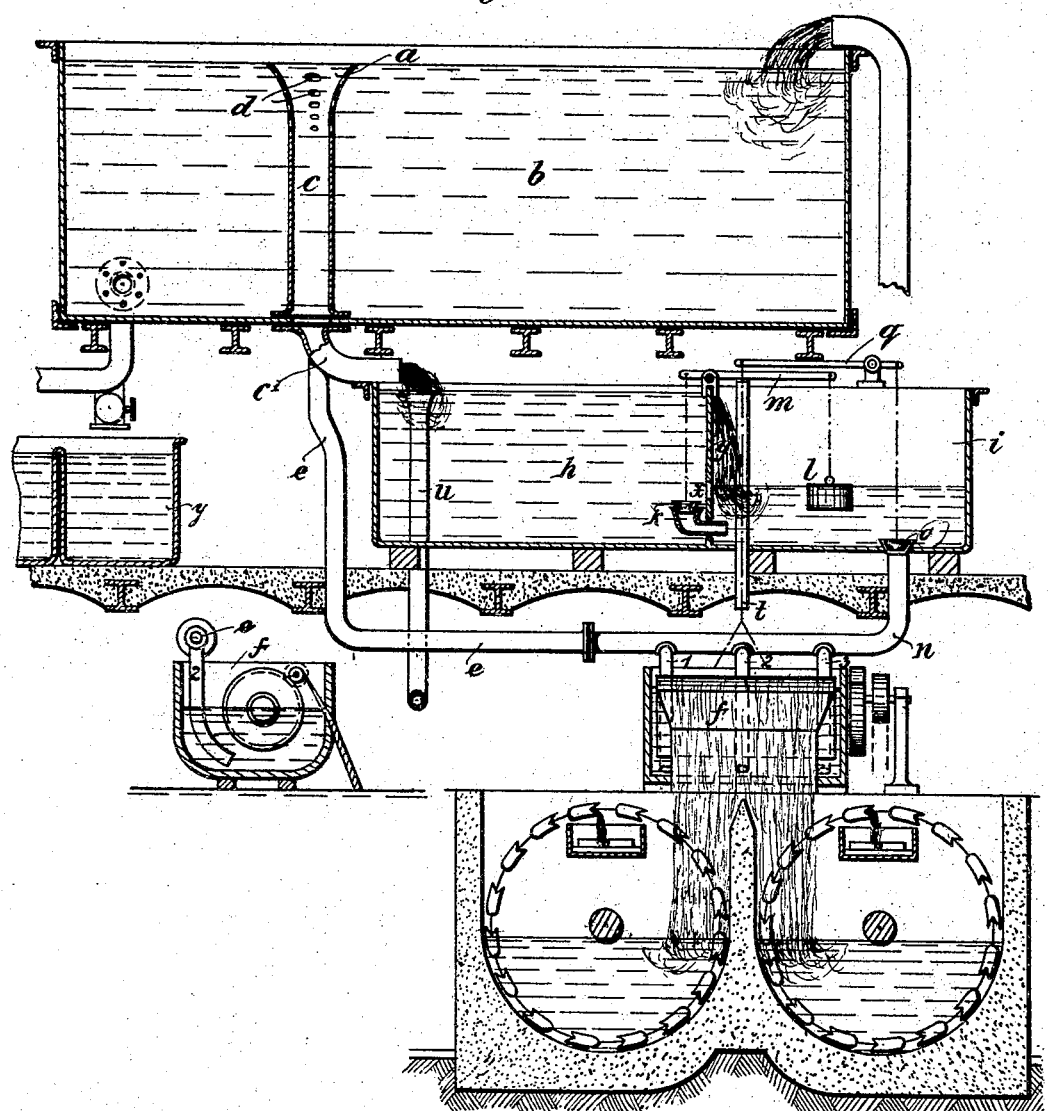

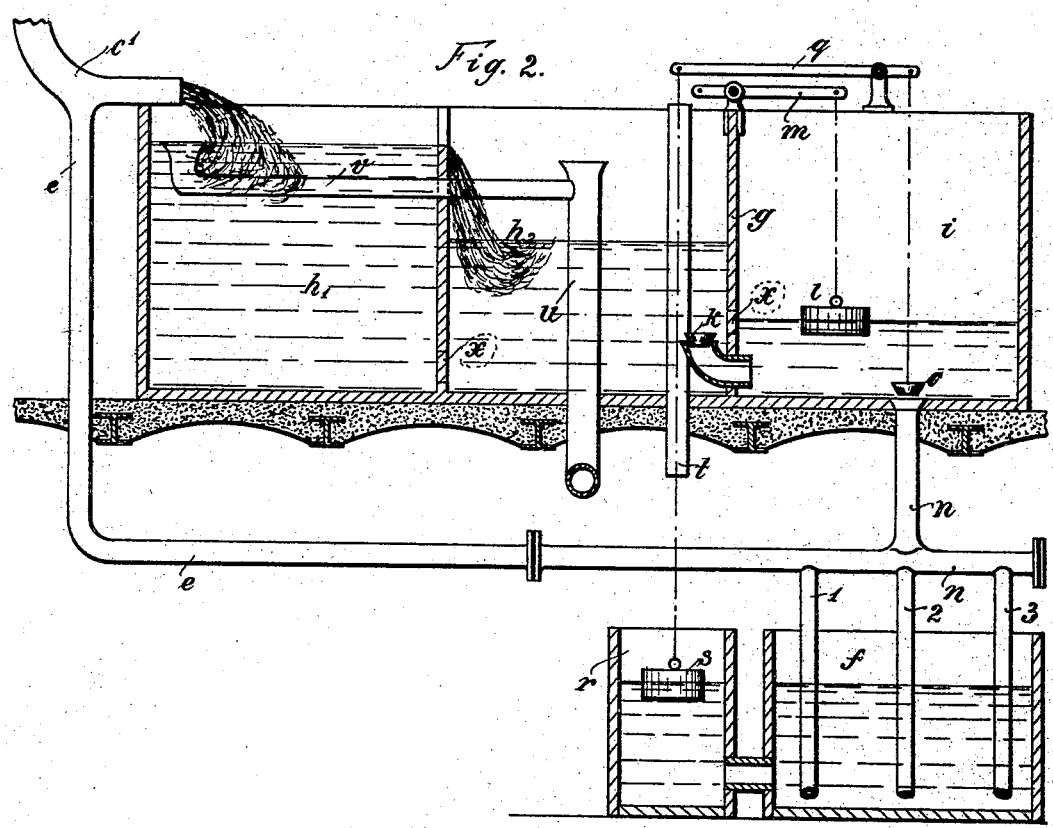
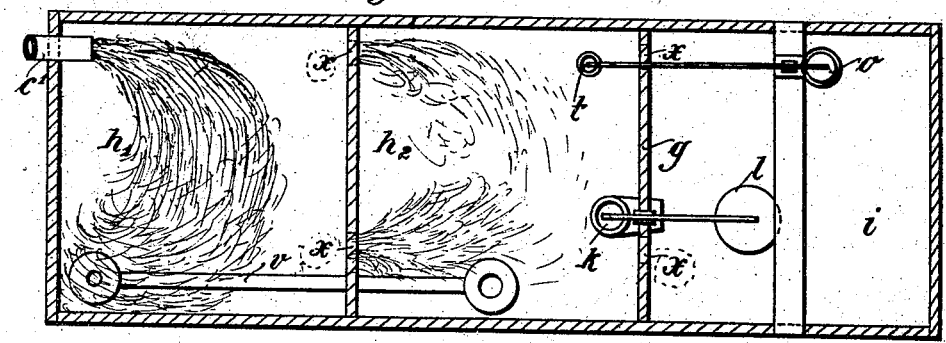

No. 767,210. Patented August 9, 1904.

UNITED STATES PATENT OFFICE.

ROBERT DIETRICH, OF MÜHLBERG, MERSEBURG, GERMANY.

PAPER-STUFF-WATER-CIRCULATING APPARATUS FOR PAPER-MILLS.

SPECIFICATION forming part of Letters Patent No. 767,210, dated August 9, 1904.

Application filed April 1, 1903. Serial No. 150,666. (No model.)

*To all whom it may concern:*

Be it known that I, ROBERT DIETRICH, manufacturer, a subject of the Emperor of Germany, residing at 5 Mühlberg, Merseburg, Saale, in the Empire of Germany, have invented certain new and useful Improvements in Paper-Stuff-Water-Circulating Apparatus for Paper-Mills, of which the following is a specification.

The subject of this invention is certain apparatus or plant for the circulation of the liquid charged with paper stuff or pulp in paper or paper-stuff mills with the object of insuring a uniform supply of such pulp-water to the pulp catchers or sifters. In paper works, as is generally known, the breast boxes or vats, which in modern paper-mills are often of particularly large dimensions, are charged with the pulp-water from the circulation-tank. The level of the liquid in this circulating-tank accordingly depends both upon the amount of liquid drawn off for supplying the said vats or boxes and upon the amount of liquid received by the tank. The supply of liquid strained off in the pulp-strainers to the circulation-tank for reëmployment is not as a rule subject to any fluctuations. Consequently the level of the liquid in the circulation-tank must be determined only from the unequable amounts which are drawn off to feed the breast boxes or vats. As a rule the water-level in the circulation-tank is regulated by means of an overflow-pipe with a flaring or funnel-shaped orifice through which the pulp-water is conveyed into the pulp-catchers, by means of which any of the pulp or stuff that may be in suspension in the water is intercepted. Now while one or more breast boxes or vats are being filled the level of the liquid in the circulation-tank descends and the supply to the pulp-catcher is interrupted, and it is only after the operation of filling the breast-boxes has been completed and when the level of the liquid in the circulation-tank has had time gradually to rise once more to its highest point and has, in fact, begun to rise beyond that point that the water will run over the flaring mouth of the pulp-water overflow fitted within the circulating-tank preparatory to being conducted to the pulp-catchers. As any one of the breast-boxes is filled the level of the liquid in the circulation-tank will sink in proportion to the amount of liquid drawn off and will then gradually reascend again as the breast-box is emptied until the liquid enters the overflow-tube once more through its flaring mouth and is by such tube conveyed to the catchers or sifters. Thus it will be seen that the water-overflow and also, consequently, the supply of water to the said sifters or catchers take place periodically—that is to say, every time that the water-level in the tank rises beyond the highest point of the flaring orifice of the pulp-water overflow-tube erected in the said circulation-tank; but while these operations are taking their alternate course they have hitherto involved two alternative inconveniences—viz., either the catchers or sifters would in many cases receive more liquid charged with pulp than they could profitably deal with in the time, or else the supply of such liquid to the catchers or sifters would at intervals during the filling or emptying of the breast-boxes be interrupted altogether. Now the object of this invention is to obviate this drawback attending the merely periodical overflow of the liquid into the flare-mouthed tube and to insure a steady and uniform supply of pulp-laden liquid to the catchers.

The invention will be best understood by reference to the accompanying drawings, in which—

Figures 1 and 2 are cross-sections of the improved circulation arrangement. Fig. 3 is a plan or top view of Fig. 2, while Figs. 4, 5, and 6 are respectively a cross-section, longitudinal section, and plan illustrating the arrangement of a supply-pipe in the bottom of the pulp catcher or sifter case.

The flaring mouth of the overflow-tube $c$, erected in the circulation-tank $b$, is provided with perforations $d$, gradually increasing in size in the upward direction. These perforations instead of being round or oval holes, as shown, may be in the shape of slots narrow below and becoming gradually wider as they are situated higher. Whereas formerly an overflow of the water contained in the circulation-tank $b$ was only possible if the level in the said tank exceeded the highest point of the funnel-mouthed tube, this overflow may in the present arrangement take place at an earlier period. When the level of the liquid of the tank is low, the pulp-water passes through the smaller perforations $d$, situated below. When the water-level is higher, it passes through the comparatively small yet somewhat larger perforations placed higher, &c. By such means the overflow is prevented from taking place merely periodically, for now there is an overflow in the circulation-tank not only when the water column attains a predetermined height—i. e., the highest point of the flaring mouth—but during the whole time that the water-level rises in the said tank from the lowest to the highest point. Owing to this construction of the funnel-mouthed overflow-tube, therefore, the pulp catchers or sifters $f$ are also enabled to receive a constant (not intermittent) supply of liquid through the pipe $e$, joining the overflow-pipe, from which pipe $e$ three arms 1 2 3 open into the catchers or sifters below the dandy-roll. In order to render this constant supply of liquid to the sifters uniform, in addition to its being steady, the following arrangement is employed: Between the tank $b$ and sifters or catchers $f$ there are provided two chambers or compartments $h$ $i$, divided by a partition $g$ and connected together by means of a pipe fitted with a valve $k$. The valve $k$ is set in operation automatically by means of a float $l$, placed in the compartment $i$, through the medium of a double-armed lever $m$, to which both the float $l$ and valve $k$ are connected by means of chains. It will be readily understood that the liquid-supply to the sifters will be uniform if the water-level in the chamber $i$, from which now pulp-laden water or liquid is being supplied to the sifters through the pipe $n$, remains uniform during the operation of the sifters or catchers. The overflow from the circulation-tank $b$ is delivered into the chamber or compartment $h$, and in order to reach the catchers or sifters it must pass through the compartment $i$. Owing to this arrangement, the overflow from the circulation-tank $b$ may, if necessary, be unequal, for, if so, it will only affect the water-level in the compartment $h$, while the level of the liquid in the compartment $i$ may nevertheless be maintained at the same height, for the moment the level of the liquid in the compartment $i$ becomes lower the float $l$ opens the valve $k$ and there takes place an overflow from the compartment $h$ into the compartment $i$, such overflow continuing until the desired water column has been obtained in the compartment $i$, at which moment the said valve $k$ becomes immediately closed. That which is necessary, therfore, for feeding the sifters with pulp-water is, as before stated, a water column of predetermined size in the compartment or chamber $i$, and the size of this water column is calculated beforehand in first erecting the apparatus with reference to the dimensions of any pulp catchers or sifters $f$ that may already have been placed.

The requisite water column in the chamber or compartment $i$ may be obtained also by means of a species of bung-hole $x$, formed in the partition $g$ on a level with the valve, and at the same time by adopting an arrangement that will permit an overflow to take place at the highest point of the partition itself. (In other words, an overflow over the top edge of the partition.) The bung-holes which may be employed in causing the water to flow gradually from the compartment $h$ into the compartment $i$ or from the chamber $h$ over into the chamber $h^2$ may be of a comparatively less sectional area than that of the outlet-orifice leading from the circulation-tank and in apparatus of a simple construction need be fitted with neither floats nor valves. These overflows over the edge of the partition and at the same time through a hole formed in the partition and adapted to be closed by a bung or plug may prove of importance in the event of any unforseen disturbances occurring in the proper operation of the complete plant, as these might result in the accumulation of too large a quantity of liquid in the compartment $h$. In such cases, too, however, the level of the liquid in the compartment $i$ would be adversely affected, as it would interfere with the desired uniform liquid-supply to the sifters. In order to avoid this, the liquid is supplied to the sifters from the compartment $i$ through the valve $o$, such valve $o$ being controlled by a float $s$, placed in the chamber $r$, Fig. 2, through the medium of a double-armed lever $q$.

The pulp-water or pulp-carrying liquid is conducted to the pulp catcher or sifter $f$ as it overflows through the holes $d$ in the flare-mouth overflow-tube $a$ and is thence conducted to its destination through a junction-pipe $e$, which is of smaller section than the tube $c$, the proportion being so calculated that the said connecting-pipe $e$ shall only bring up as much pulp-water to the sifters as they can properly deal with. The surplus water overflowing through the trumpet-shaped tube $a$ passes through the junction-tube $c$ into the first or distributing chamber $h$. Now if for any reason the overflow at $d$ and the supply of pulp-water through the tubes or pipes $c$ and $e$ should cease the sifters $f$ would still get their supply from the collecting or distributing chambers $h$ and $i$ through the medium of the float $s$, valve $o$, and pipes $n$.

The pipes 1 2 3, branching off from $e$ or $n$, serve for the uniform distribution of pulp-water in the sifter $f$. They open at a little distance from the bottom of the sifter below the dandy-roll, so that the pulp-water is admitted from below, the reception of the fiber by the pulp-catching cylinders being assisted by the ascending motion of the floating fiber. As illustrated in Figs. 4 to 6, the tubes 1 2 3 may be replaced by a single tube $e'$, built into the bottom of the pulp-catching case $f^2$ below and in the longitudinal direction of the pulp-catching cylinder (or dandy-roll) $f'$. This tube $e'$, of preferably oval cross-section, is provided in its upper wall with one or more series of perforations $e^2$ through which the pulp-water is ejected toward the pulp-catching cylinder. A supporting-plate 4, a bent piece or yoke 5, holding such plate, and a screw-bolt 6 admit of the detachable and at the same time water-tight fixing of the tube $e'$ in the bottom of the pulp catcher or sifter $k$.

In order to enable the water from the overflow-tube to reach the compartment $i$ in as even a current as possible, the compartment $h$, which the water from the said overflow-tube reaches first may be replaced by two or more chambers—such, for example, as are shown at $h'$ and $h^2$ in Fig. 2.

The tube $u$, with its mouth flaring in the shape of a trumpet or funnel, serves to carry off the froth that collects in the chamber $h$, the tubes $u$ and $v$, Fig. 2, which are connected with each other, both serving the same purpose, while at the same time they serve as additional overflow-tubes to support the main overflow-tube $c$. On the surface of the circulating liquid there forms a froth or scum containing fat and impurities, which collects on the top of the liquid in the chamber $h$ or $h'$, as the case may be, and describes an arc of a circle in relation to the trumpet-shaped mouth of the tube $u$ or $v$, as the case may be, over or from which it runs off. A like or similar scum-catching device may also, if desired, be provided in the second or third collecting chamber or receiver.

What I claim, and desire to secure by Letters Patent of the United States, is—

1. The combination, with a circulation-tank, and a pulp-catcher; of the interposed chambers, an overflow-pipe connecting the circulation-tank with the first interposed chamber, means for controlling the flow between the interposed chambers, and a pipe connecting the last interposed chamber with the pulp-catcher.

2. The combination, with a circulation-tank, and a pulp-catcher; of the interposed chambers, an overflow-pipe connecting the circulation-tank with the first interposed chamber, means for controlling the flow between the interposed chambers, a float-chamber connected with the pulp-catcher, a pipe, connecting the last interposed chamber with the pulp-catcher, having a valve and a float in the float-chamber connected with the valve.

3. The combination, with a circulation-tank, and a pulp-catcher; of the interposed chambers, an overflow-pipe connecting the circulation-tank with the first interposed chamber, having a mouth formed with openings gradually increasing in size upwardly, means for controlling the flow between the interposed chambers and a pipe connecting the last interposed chamber with the pulp-catcher.

4. The combination, with a circulation-tank, and a pulp-catcher; of the interposed chambers, an overflow-pipe connecting the circulation-tank with the first interposed chamber, means for controlling the flow between the interposed chambers, a pipe connecting the last interposed chamber with the pulp-catcher, and an overflow-pipe located in the first interposed tank at a point removed from agitation below the highest water-level.

5. The combination, with a circulation-tank, and a pulp-catcher; of the interposed chambers, an overflow-pipe connecting the circulation-tank with the first interposed chamber, means for controlling the flow between the interposed chambers, a discharge-pipe connecting the last interposed chamber with the pulp-catcher, and a series of pipes connecting the discharge-pipe with the pulp-catcher a little distance above the bottom of the latter.

6. The combination, with a circulation-tank, and a pulp-catcher; of the interposed chambers an overflow-pipe connecting the circulation-tank with the first interposed chamber, means for controlling the flow between the interposed chambers, a discharge-pipe connecting the last interposed chamber with the pulp-catcher and a pipe connecting the overflow-pipe directly with the discharge-pipe.

In testimony whereof I have hereunto set my hand, in presence of two subscribing witnesses, this 5th day of March, 1903.

ROBERT DIETRICH.

Witnesses:
R. V. L. DUNN,
RUDOLPH FRICKE.